(12) United States Patent
Nie

(10) Patent No.: US 9,173,083 B2
(45) Date of Patent: Oct. 27, 2015

(54) WIRELESS ROAMING METHOD AND ACCESS CONTROLLER

(71) Applicant: Hangzhou H3C Technologies Co., Ltd., Hangzhou (CN)

(72) Inventor: Shuwei Nie, Beijing (CN)

(73) Assignee: HANGZHOU H3C TECHNOLOGIES CO., LTD., Zhejiang (CN)

( * ) Notice: Subject to any disclaimer, the term of this patent is extended or adjusted under 35 U.S.C. 154(b) by 0 days.

(21) Appl. No.: 14/401,434

(22) PCT Filed: Aug. 13, 2013

(86) PCT No.: PCT/CN2013/081365
§ 371 (c)(1),
(2) Date: Nov. 14, 2014

(87) PCT Pub. No.: WO2014/026591
PCT Pub. Date: Feb. 20, 2014

(65) Prior Publication Data
US 2015/0163657 A1    Jun. 11, 2015

(30) Foreign Application Priority Data

Aug. 14, 2012 (CN) .......................... 2012 1 0288396

(51) Int. Cl.
| H04M 1/66 | (2006.01) |
| H04W 8/02 | (2009.01) |
| H04W 12/06 | (2009.01) |
| H04W 12/04 | (2009.01) |
| H04L 29/06 | (2006.01) |

(52) U.S. Cl.
CPC ................ *H04W 8/02* (2013.01); *H04W 12/04* (2013.01); *H04W 12/06* (2013.01); *H04L 63/162* (2013.01)

(58) Field of Classification Search
CPC ....... H04W 12/06; H04W 12/12; H04L 63/08
USPC ............ 455/411, 410, 432.1, 435.1, 436, 442
See application file for complete search history.

(56) References Cited

U.S. PATENT DOCUMENTS

| 2005/0254653 | A1  | 11/2005 | Potashnik et al. |
| 2006/0187878 | A1* | 8/2006  | Calhoun et al. ............... 370/331 |
| 2010/0281249 | A1* | 11/2010 | Das et al. ...................... 713/151 |

FOREIGN PATENT DOCUMENTS

| CN | 1813454   | 8/2006  |
| CN | 101730194 | 6/2010  |
| CN | 102256250 | 11/2011 |

OTHER PUBLICATIONS

International Search Report and Written Opinion dated Nov. 21, 2013 issued on PCT Patent Application No. PCT/CN2013/081365 dated Aug. 13, 2013, The State Intellectual Property Office, P.R. China.
Narayanan et al., EAP Extensions for EAP Re-authentication Protocol (ERP), RFC 5296, Aug. 2008.
Ohba et al., Extensible Authentication Protocol (EAP) Early Authentication Problem Statement, RFC 5836, Internet Engineering Task Force (IETF), ISSN 2070-1721, Apr. 2010.

* cited by examiner

*Primary Examiner* — Nghi H Ly
(74) *Attorney, Agent, or Firm* — Mannava & Kang, P.C.

(57) ABSTRACT

According to an example, a reauthentication or reassociation message carrying a roaming group information may be received from a wireless client (STA) by an AC when the STA is roaming. In addition, the AC may determine, according to the roaming group information and the received reauthentication or reassociation message, whether the STA is roaming between roaming groups or within a roaming group. In response to a determination that the roaming is between roaming groups, an extension authentication protocol (EAP) reauthentication process may be initiated and in response to a determination that the roaming is within a roaming group, a Key Cache method may be adopted to authenticate the STA.

15 Claims, 5 Drawing Sheets

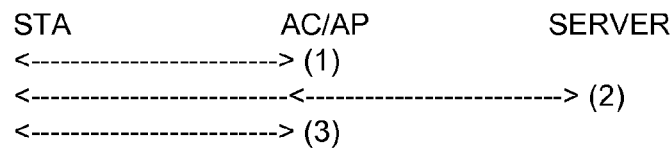
Fig.5
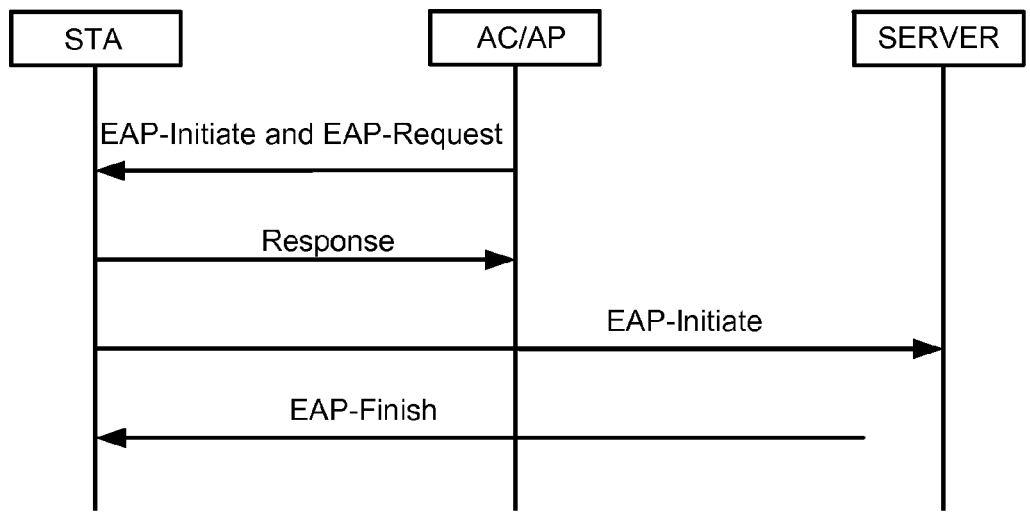
Fig.6
Fig.7

```
0                   1                   2                   3
0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|     Code      |  Identifier   |            Length             |
+-+-+-+-+-+-+-+-+-+-+-+-+-+-+-+-+-+-+-+-+-+-+-+-+-+-+-+-+-+-+-+-+
|     Type      |  Type-Data ...
+-+-+-+-+-+-+-+-+-+-+-+-+-+-+-+-+-
```

WIRELESS ROAMING METHOD AND ACCESS CONTROLLER

CLAIM FOR PRIORITY

The present application is a national stage filing under 35 U.S.C 371 of PCT application number PCT/CN2013/081365, having an international filing date of Aug. 13, 2013, which claims priority to Chinese patent application number 201210288396.5 having a filing date of Aug. 14, 2012, the disclosures of which are hereby incorporated by reference in their entireties.

BACKGROUND

Roaming is a key technique in wireless local area networks (WLANs) and is an important basis for a wireless terminal to achieve mobility. At present, mainstream WLAN networking techniques include an access controller (AC) and a Fit access point (AP). A Fit AP provides wireless encryption while using the AC for the actual key exchange. Under this technique, the manner in which seamless roaming for a wireless client (STA) is performed and in particular, how roaming of STA's between different ACs is performed is an index that is used to evaluate the performance of a wireless device.

BRIEF DESCRIPTION OF THE DRAWINGS

Features of the present disclosure are illustrated by way of example and not limited in the following figure(s), in which like numerals indicate like elements, in which:

FIG. 5 is a schematic diagram illustrating the format of roaming group information according to an example of the present disclosure;

FIG. 6 is a schematic diagram illustrating an information interaction process of a full EAP authentication according to an example of the present disclosure;

FIG. 7 is a schematic diagram illustrating a specific information interaction process of an EAP reauthentication according to an example of the present disclosure;

DETAILED DESCRIPTION

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the term "includes" means includes but not limited to, the term "including" means including but not limited to. The term "based on" means based at least in part on.

Figure 1:
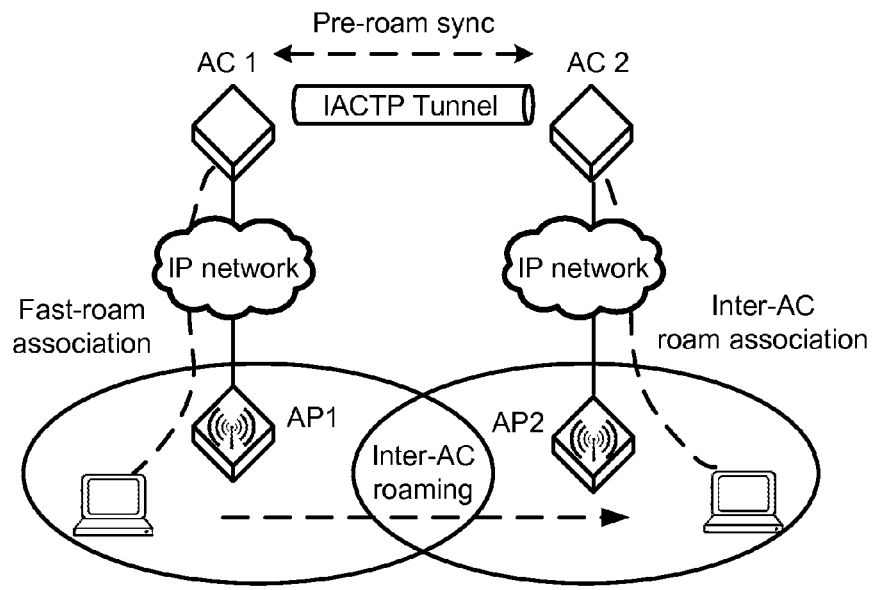
FIG. 1 is a schematic diagram illustrating a system for fast roaming within a group by Key Cache according to an example of the present disclosure.

Currently, Key Cache is mainly used to perform roaming of a mobile terminal (STA) between different access controllers (ACs). Key Cache is a method in which a STA may access a plurality of ACs by a direct key negotiation process, because the STA's key information is synchronized between the plurality of ACs. Thus each AC of the plurality has a copy of the STA's key information. For example, as shown in FIG. 1, all of the ACs that may participate in the roaming of a STA form a roaming group. The establishment and maintenance of the roaming group may be performed by an inter access controller tunneling protocol (IACTP). In addition, any of the ACs may have an association with the STA and there may be a need to synchronize this STA's key information among all of the member ACs in the roaming group.

When an STA roams, key negotiating may be carried out directly to achieve fast roaming. For example, as shown in FIG. 1, AC1 and AC2 may have already synchronized the STA's key information when the STA is initially connected to the roaming group. When the STA roams from the access point AP1 of AC1 to the AP2 of AC2, key negotiating may be carried out directly, thereby resulting in fast roaming.

According to an example of the present disclosure, all of the ACs may join respective parallel roaming groups as needed, in which roaming between ACs within each roaming group is carried out by way of Key Cache and roaming between ACs among parallel roaming groups activates an EAP (extensible authentication protocol) reauthentication process. Thus, all of the ACs may participate in the roaming of the STA without a great deal of information interaction and without occupying a great deal of system resources.

Figure 2:
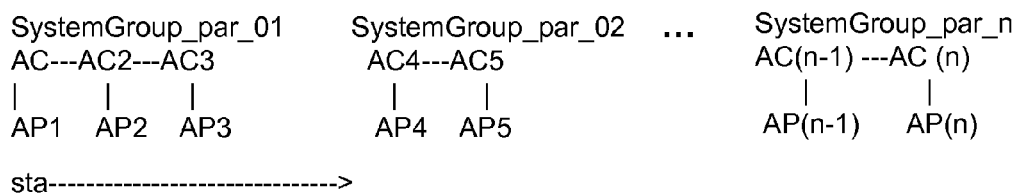
FIG. 2 is a schematic diagram illustrating the principle of fast roaming according to an example according to an example of the present disclosure.

As shown in FIG. 2, all of the ACs join n roaming groups, which are labeled as "SystemGroup_par_xx" respectively, in which the number of member ACs in each of the n roaming groups may be configured as needed and may not be fixed. According to a particular example, the number of member ACs in each of the roaming groups is no more than 3. However, there is no limitation on the number of parallel roaming groups that can be configured as needed, as long as all of the ACs that may participate in the roaming of the STA are included in a roaming group.

Within each of the n roaming groups SystemGroup_par_xx, Key Cache may be used if an STA wants to roam between ACs, that is, in each SystemGroup_par_xx, any member AC may synchronize and cache key information of the STAs connected to all of the other member ACs within the group so as to achieve fast roaming between the ACs within the roaming group.

However, the ACs in parallel roaming groups SystemGroup_par_01 and SystemGroup_par_02 may not need to synchronize with each other, that is, there may not be a need to synchronize key information of the STAs between the ACs in parallel roaming groups. Between parallel roaming groups, as shown in FIG. 2, for example, if an STA wants to roam from AP1 of AC1 to AP5 of AC5, that is, the two ACs that are to perform the roaming are not within the same roaming group, then an EAP reauthentication may be carried out, so as to achieve fast roaming between the roaming groups.

Figure 3:
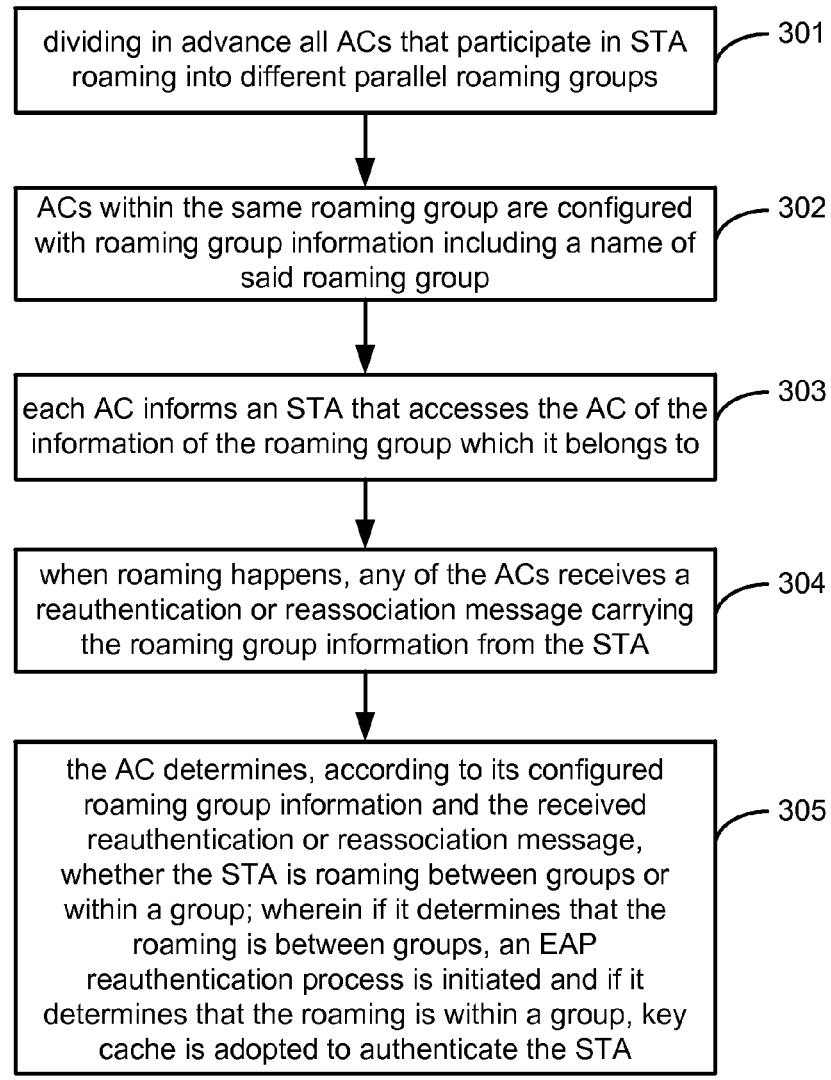
FIG. 3 is a flow chart illustrating a method according to an example of the present disclosure.

A flow chart of a wireless roaming method according to an example is shown in FIG. 3.

In block 301, a plurality of access controllers (ACs) that participate in the roaming of a wireless client (STA) may be divided into different parallel roaming groups. According to an example, the plurality of ACs include all of the ACs that may participate in the roaming of the STA. In addition, the ACs may be divided into the different parallel roaming groups in advance.

The division into parallel roaming groups may be configured manually as needed and may thus be implemented according to a user's requirement. The configuring of the parallel roaming groups may be divided according to the following rules:

A. the ACs within the same network segment must be in the same roaming group;

B. the sum of the numbers of STAs that are allowed to be accessed by all of the ACs within each roaming group should be equal to or close to each other;

C. the sum of the numbers of APs that are managed by all of the ACs within each roaming group should be equal to or close to each other; and D. each AC can only be configured in one roaming group.

Figure 4:
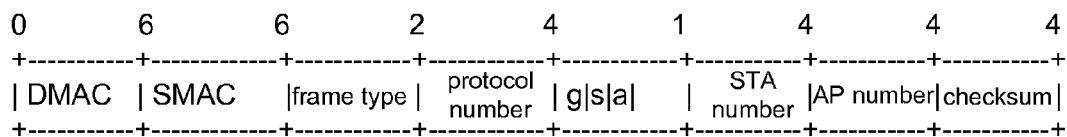
FIG. 4 is a schematic diagram illustrating the format of information interacted between ACs according to an example of the present disclosure.

Additionally, the division into parallel roaming groups may be performed automatically. In this example, an automatic roaming grouping function on each AC may be activated. In an example, the automatic dividing into parallel roaming groups may be implemented as follows:

Assuming AC' to be any AC that has not currently joined a roaming group, the AC' sends broadcast messages periodically to request responses from other ACs if the AC' determines that it is not within any roaming group. AC' may determine that it has not joined a roaming group if it is not configured with the name of a roaming group. If a response from another AC is received in a predetermined time, the responding AC interacts with AC' by way of interaction messages. The format of the interaction messages may be defined as illustrated in FIG. 4, which shows an interaction message as having the fields: destination media access control address (DMAC), source MAC address (SMAC), frame type, protocol number, flag bit g, flag bit s and flag bit a, the number of STAs, the number of APs, and a checksum, wherein flag bit g, flag bit s and flag bit a may be defined as:

g represents whether the AC has joined a roaming group, particularly, for instance, g=1 indicates that the AC has joined a roaming group and g=0 indicates that the AC has not joined a roaming group;

s represents whether the number of STAs which the AC is allowed to access is carried, particularly, for instance, s=1 indicates that the number of STAs which the AC is allowed to access is carried and s=0 indicates that the number of STAs which the AC is allowed to access is not carried;

a represents whether the number of APs which the AC has accessed is carried, particularly, for instance, a=1 indicates that the number of APs which the AC has accessed is carried and a=0 indicates that the number of APs which the AC has accessed is not carried;

other bits are reservation bits and may be set to 0.

If g is 0, this may be an indication that the AC has been grouped into a roaming group. If s or a is 0, this may be an indication that the AC is in an abnormal operation state. Thus, if any of g, s, and a is 0, AC' will join the roaming group of the AC.

The number of STAs may represent the number of STAs that the AC allows to access a network. In addition, the number of APs may represent the number of APs accessed by the AC.

According to an example, if the responding AC carries the number of STAs that the AC allows to access the network, AC' may acquire the number of the STAs that the responding AC allows to access the network and then grouping may be performed. As such, the format of the interaction information may only need to include the following fields: destination MAC address (DMAC), source MAC address (SMAC), frame type, protocol number, flag bit g|s|, the number of STAs, and a checksum. As for the flag bits, only g and s may be needed.

AC' may interact with any responding AC. When AC' learns that the flag bits g and s in the interacting message of a responding AC are both 1, AC' may determine that this responding AC is available to be grouped and may acquire information pertaining to the number of STAs that this AC allows to access the network. If there are K ACs that are available to be grouped, then information of the number of STAs that the K ACs respectively allow to access is obtained, in which K is a positive integer ≥1.

Through the above message interaction, if AC' obtains the number of STAs that K ACs that are available to be grouped allow to access respectively, then the K ACs that are available to be grouped and the AC' are organized into a linked list according to an order of the number of STAs that they respectively allow to access. If the remainder of (K+1) divided by 2 equals 0, then the head element and the tail element of the linked list are combined in turn, until AC' appears, and then AC' may send a unicast confirmation message to an AC that is combined with AC' so as to form a roaming group. The head element and the tail element of the linked list may be combined in turn, e.g., the linked list AC is arranged as AC1, AC', AC2, AC3, AC4, AC5, then the head element and the tail element of the linked list are combined in turn, i.e., AC1AC5 are combined, AC'AC4 are combined, etc. If AC' occurs in the combination, the combination is stopped, and AC4 is the AC to be combined with AC' and AC' may be grouped together with AC4.

If the remainder of (K+1) divided by 2 equals 1 and AC' is not the $(K+1)^{th}$ element after the ordering, then the $(K+1)^{th}$ element is excluded and the other elements are organized into a linked list. The head element and the tail element of the linked list may be combined in turn, until AC' appears, and then AC' may send a unicast confirmation message to an AC that is combined with AC' so as to form a roaming group. If AC' is the $(K+1)^{th}$ element after the ordering, then the head element and the tail element of the linked list may be combined and AC' may send a unicast confirmation message to an AC that is combined with AC' so as to form a roaming group.

By way of particular example, AC' sends a broadcast message periodically (with a period of T). In this example, a plurality of ACs respond within the time of N×T. However, only K ACs are available to be grouped, then a total of k+1 ACs form a linked list according to an ascending or a descending order of the number of STAs that are allowed to be accessed. If (k+1)/2=0, then the head and tail elements (i.e. [a,k+2−a]) of the linked list are combined in sequence, until AC' appears, and an AC that is combined with AC' is the AC that selects the same roaming group.

Generally, grouping may be performed by comparing the number of STAs that the ACs allow to access a network, respectively. In particular, if the number of STAs that AC' allows to access is the same as the number of STAs that the K ACs allow to access, the number of APs managed by the respective ACs may be compared. That is, the K ACs and AC' form a linked list according to an order of the number of APs they manage respectively. The steps that follow may be the same.

If the number of APs managed by the AC' is also the same as the number of APs managed by K ACs, one of the ACs may be randomly selected from the K ACs to form a roaming group with AC'.

Each parallel roaming group may include two member ACs. In particular, if one AC is left in the end, the AC may be left in a group separately. It may be understood that the number of member ACs within each of the parallel roaming groups may be adjusted as required or desired.

While dividing a roaming group as discussed above, the priority order for the factors to be taken into account for whether ACs are to be grouped in the same roaming group may be as follows, in descending order: the same network segment, the number of STAs that are allowed to be accessed, the number of APs that are managed, and random. Since AC' sends a broadcast request, the responding AC and the AC' must be within the same network segment.

Following periodic sending of a broadcast message by an AC, if no response message is received from any other ACs within a predetermined time, then the AC itself may become a separate roaming group and may broadcast a request message at a predetermined interval of time, until the AC receives a response from any of the other ACs. Then grouping may be performed according to the above-described process for automatically grouping the ACs into roaming groups.

If a roaming group has only one AC, this AC may broadcast a request message at a time interval of Ti to thereby determine whether there are still any separate AC groups, in which the value of Ti, may be set as required or desired. According to an example, if the value of Ti is set to 0, this function will not be enabled.

If the automatic roaming grouping function of an AC is cancelled, the AC may automatically delete the roaming group of the AC.

Through the automatic generation of parallel roaming groups, the amount of workload on the administrator may be reduced and possible configuration errors may be reduced or eliminated. With the parallel roaming groups, the number of roaming STAs that are accessible by roaming ACs may be increased and the range that the STAs may roam may be enlarged. Further, through the roaming behavior of the STAs between parallel roaming groups disclosed herein, the STAs may roam between arbitrary networks, wireless networking capability may be improved, and limitations on the current AC device may be avoided.

In block 302, the ACs within the same roaming group may be configured with roaming group information that includes a name of the roaming group. The format of roaming group information according to 802.11-2007 may be as shown in FIG. 5. Particularly, for instance, the roaming group information may include: information type (Ele-ID, i.e., Element ID), information length (Length), self-defined name of the roaming group.

The name of a roaming group may be self-defined, as shown in FIG. 5. For example, the name of a parallel roaming group on each AC may be automatically generated as SystemGroup_par_Mac_addr, in which Mac_addr compares mac addresses of Ethernet interfaces for communication of two member ACs within the roaming group and the smaller one may be selected. The length for the name of the roaming group may also be self-defined.

In block 303, each of the ACs may inform an STA that accesses the AC of the information of the roaming group to which the AC belongs. Particularly, for instance, when an STA initially connects to an AC, the AC may inform the STA of information of the roaming group to which the AC belongs with an association response message. The STA may store this information and may carry this information when roaming. As another example, when an STA that is added with the roaming group information is connected to any of the ACs, the AC to which the STA is connected may inform the STA of information of the roaming group to which the AC belongs and the STA may update its roaming group information to the information of the roaming group to which the currently connected AC belongs.

In block 304, when roaming occurs, any of the ACs may receive a reauthentication or reassociation message carrying the roaming group information from the STA. Particularly, for instance, when an STA roams, a reauthentication message or a reassociation message may be sent. The decision as to whether a reauthentication message or a reassociation message is to be sent may be decided by the manufacturer of the STA. According to an example, the roaming group information is only carried within the reauthentication message or reassociation message sent from the STA (i.e., the initial message when the STA roams).

If the STA roams by resending an authentication request, the roaming group information is carried in the authentication message. If the STA roams by sending a reassociation message directly, the roaming group information is carried in the reassociation message. If the STA roams by sending a reauthentication request and this roaming group information is also carried in an association message, the roaming group information in the association message may be ignored.

Before the STA roams, a key aging timer may be set on all of the ACs that participate in the STA roaming. When the STA leaves any of the ACs within a roaming group, the key aging timer on the AC may be triggered to begin timing. After the aging time expires, the AC may delete the Key Cache entries corresponding to the STA.

Furthermore, in order to prevent the STA from roaming repeatedly between two ACs (roaming repeatedly may mean that the STA is in an abnormal operation state), if the AC receives a roaming connection request (i.e., a reauthentication or reassociation message) with the same MAC address for a number of times that exceeds a predefined number of times, e.g., 3 times, within a predetermined period of time, e.g., within one tenth of the aging time of the key aging timer, before the aging time expires, the AC will no longer accept the roaming connection request of this STA. As such, the STA may not be able to roam.

In block 305, when the AC determines, according to its configured roaming group information and the received reauthentication or reassociation message, that the STA is roaming between roaming groups, an EAP reauthentication process may be initiated. When the AC determines that the roaming is within a roaming group, Key Cache method is used for authentication. An example of Key Cache method is explained in detail with reference to FIG. 7. Further, if the AC determines that the STA is accessed for the first time, then a full EAP authentication process may be initiated.

Figures 8, 9:
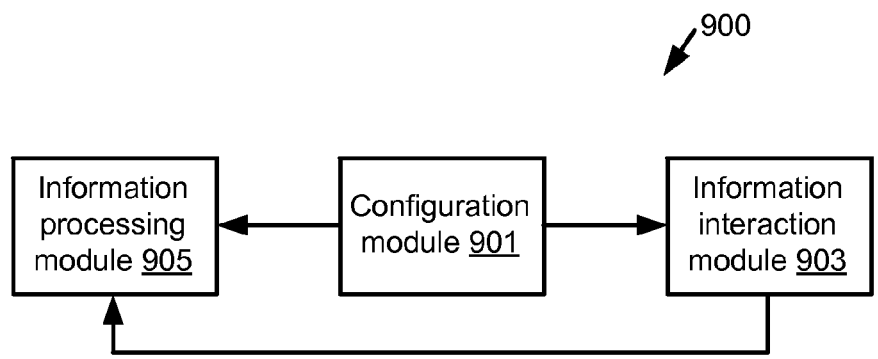
FIG. 8 is a schematic diagram illustrating the format of an EAP message according to an example of the present disclosure.
FIG. 9 is a block diagram of a device according to an example of the present disclosure.

The AC may check whether the received reauthentication or reassociation message includes the roaming group information or not. If the received reauthentication or reassociation message does not include the roaming group information, the AC may determine that the STA is accessed for the first time and a full EAP authentication process may be initiated. If the reauthentication or reassociation message does include the roaming group information, the AC may check whether the roaming group name in the roaming group information is identical to the roaming group name configured on the AC or not. If not, the AC may determine that the STA is roaming between roaming groups and an EAP reauthentication process may be initiated. When the EAP reauthentication process is initiated, the data content (Type-Data) field (as shown in FIG. 8) of the EAP message in the interaction process may carry the roaming group name in the roaming group information. An authentication server may determine that the STA roams between roaming groups with this field. After the EAP reauthentication process is initiated, a full EAP authentication process may be initiated if the EAP reauthentication process fails. If the roaming group name in the roaming group information is identical to the roaming group name configured on the AC, the AC may check whether its Key Cache information includes the STA's key entry. If yes, the AC may determine that the STA is roaming within a roaming group and Key Cache is adopted. If no, the AC may determine that the STA is accessed for the first time and a full EAP authentication process may be initiated. One of the reasons for checking the information of key entry is that a synchronization failure may occur when the STA key entry is synchronized between member ACs in a roaming group. In this instance, the STA key entry may not be found in the Key Cache entries of the AC, although the names of the roaming groups are identical. The STA key entry may be found only when the synchronization is successful.

In an example, a method for the AC to check whether the received reauthentication or reassociation message includes the roaming group information may include the following. The AC may check whether the reauthentication or reassociation message includes a preset common keyword of a roaming group. If yes, the received reauthentication or reassociation message is determined to include the roaming group information. Otherwise, the received reauthentication or reassociation message is determined to not include the roaming group information.

The common keyword of a roaming group may be self-defined. For example, as shown in FIG. 5, the common character SystemGroup_par for the names of the roaming groups may be selected as the common keyword of a roaming group.

To facilitate understanding of the present application, the above full EAP authentication process, the EAP reauthentication process, and the manner of Key Cache are briefly introduced as follows:

An example of the full EAP authentication process is shown in FIG. 6. As shown therein, Procedure (1) is a procedure of a STA accessing a WLAN, including authentication and association procedures of the WLAN, Procedure (2) is a procedure of the STA passing a 802.1x authentication, and Procedure (3) is a 4-way-handshake, i.e., WLAN's 4-way-handshake (key negotiation) procedure.

The detail of the EAP reauthentication process is described in protocol RFC5269, namely a simplified procedure (2) plus procedure (3), i.e., a procedure of a STA passing the 802.1x authentication. In one regard, the access authentication of a user to a STA may be performed by only one EAP interaction (corresponding to one interaction of Request and Response), while the full procedure (2) requires a large number of message interactions. However, some message interactions may be omitted in the simplified procedure (2) in the EAP reauthentication process and only a small number of message interactions may be needed, saving a considerable amount of time for authentication (the 802.1x authentication).

Turning now to FIG. 7, there is shown a schematic diagram illustrating a specific information interaction process of an EAP reauthentication according to an example. The process shown in FIG. 7 may be carried out after the EAP process starts, and the STA's user authentication process is completed between the STA and the authentication server SERVER by a minimum of one message interaction so that the key negotiation is directly carried out. Referring to FIG. 7, once the EAP reauthentication starts, the AC may send EAP-initiate and EAP-request messages to the STA. The STA may return a Response to the AC. During the EAP reauthentication process, the STA may transparently transmit the EAP-Initiate message to the server SERVER through the AC, and the server SEVER may transparently transmit an EAP-Finish message back to the STA through the AC.

All of the STAs connected to any of the parallel roaming groups may be authenticated by the same authentication server.

Authentication of a STA when the STA roams between ACs within a roaming group, may be accomplished by using a Key Cache method. In contrast to the full EAP authentication process depicted in FIG. 6, the manner of Key Cache may for example just be procedure (1) plus procedure (3), in which procedure (2), i.e., the 802.1x authentication procedure, is omitted, with the premise that the STA's FA (Foreign AC) has synchronized the key information negotiated when this STA accesses the AC for the first time. A key negotiation may be directly performed in this roaming.

When a STA associates with an AC within a roaming group for the first time, this AC may be considered to be the STA's HA (Home-AC). When the STA associates with an AC that is not the HA, this AC may be considered as the STA's FA.

In particular, in a normal process, procedure (1) may include authentication and association procedures when the STA accesses the WLAN. If the STA directly sends a reassociation message during roaming, the authentication procedure when the STA accesses the WLAN may be omitted if it is determined that the FA has already synchronized the key information negotiated when this STA accesses the AC for the first time.

Using the Key Cache method may not necessarily add any additional pressure on the system, after a reasonable number of ACs are configured in the group. For example, 4 ACs may be configured into two roaming groups, and in this case only two ACs within each of the two groups will synchronize information of roaming STAs with each other. However, if all of the 4 ACs are put in the same roaming group, then each of the ACs needs to synchronize information of the key cache entries of the STAs accessed by the other 3 ACs. In this case, each of the ACs may store key information of a large number of STAs and a relatively large number of messages may be interacted between all the ACs. If the parallel roaming groups are automatically generated as discussed herein, then there may be at most two member ACs in each of the parallel roaming groups, which may avoid the above problems.

By controlling the number of ACs within each of the roaming groups, the number of key cache entries for the ACs within each of the roaming groups is reduced and message interactions between ACs within each of the roaming groups may be reduced, which may reduce burden on the ACs.

The device structure of an AC according to an example of the present disclosure is shown in FIG. 9. As shown therein, an access controller (AC) 900 is provided, in which all of the ACs that participate in a wireless client (STA) roaming are divided into different parallel roaming groups. The AC 900 is depicted as including a configuration module 901, an information interaction module 903, and an information processing module 905.

The configuration module 901 is to configure the AC 900 with roaming group information including a name of the roaming group to which the AC belongs, in which ACs within the same roaming group are configured with roaming group information that includes the name of the roaming group.

The information interaction module 903 is to inform an STA that accesses the AC of the roaming group information and is further to receive a reauthentication or reassociation message carrying the roaming group information from the STA when the STA roams.

The information processing module 905 is to determine, according to its configured roaming group information and the received reauthentication or reassociation message, whether the STA is roaming between roaming groups or within a roaming group, in which an EAP reauthentication process may be initiated if the information processing module 905 determines that the roaming is between roaming groups, and the Key Cache method may adopted to authenticate the STA if the information processing module 905 determines that the roaming is within a group.

In an example, the information processing module 905 is further to check whether the name of the roaming group in the roaming group information carried by the reauthentication or reassociation message is identical to the name of the roaming group configured on the AC. If the name of the roaming group is not identical, the information processing module 905 may determine that the STA is roaming between groups and the EAP reauthentication process may be initiated. If the name of the roaming group is identical to the name of the roaming group configured on the AC, the information processing module 905 may check whether the AC's Key Cache information includes the STA's key entry. If yes, the AC may determine that the STA is roaming within a group and the Key Cache method may be adopted to authenticate the STA. If no, the AC may determine that the STA is accessed for the first time and a full EAP authentication process may be initiated.

Further, the information processing module 905 may further check whether the received reauthentication or reassociation message includes the roaming group information before checking whether the name of the roaming group in the roaming group information carried by the reauthentication or reassociation message is identical to the name of the roaming group configured on the AC.

If the received reauthentication or reassociation message does not include the roaming group information, the information processing module 905 may determine that the STA is accessed for the first time and a full EAP authentication process may be initiated.

If the received reauthentication or reassociation message includes the roaming group information, the information processing module 905 may check whether the name of the roaming group in the roaming group information is identical to the name of the roaming group configured on the AC.

In an example, the format of the roaming group information configured by the configuration module 901 for the AC includes information type, information length, and the self-defined name of the roaming group.

When the EAP reauthentication process is initiated by the information processing module 905, the data content field (Type-Data) of the EAP message in the interaction process carries the name of the roaming group in the roaming group information. The information processing module 905 may further initiate the full EAP authentication process if the EAP reauthentication process fails, after the EAP reauthentication process is initiated.

In an example, the access controller 900 may further include a key aging module (not illustrated in FIG. 9), which may set a key aging timer on the AC. When the STA leaves the AC, the key aging module may trigger the key aging timer to begin timing. After the aging time expires, the key aging module may delete the key cache entries corresponding to the STA.

The information interaction module 903 may further no longer accept any reauthentication or reassociation message from the STA if the STA reauthentication or reassociation message with the same MAC address is received for a number of times that exceeds a predefined number, before the aging time expires.

In the present disclosure, if it is determined that the STA is accessed for the first time, then a full EAP authentication process may be initiated. If it is determined that the STA roams within a group, the above described Key Cache may be adopted to authenticate the STA. If it is determined that the STA roams between roaming groups, the EAP reauthentication process may be initiated, and after the key is negotiated, the key may be synchronized between all member ACs within the roaming group by way of Key Cache. In one regard, the ability of the STA to perform fast roaming between any ACs may be achieved by the combination of Key Cache and reauthentication as discussed herein.

The above examples may be implemented by hardware, software, firmware, or a combination thereof. For example, the various methods, processes, and functional modules described herein may be implemented by a processor (the term processor is to be interpreted broadly to include a CPU, processing module, ASIC, logic module, or programmable gate array, etc.). The processes, methods, and functional modules may all be performed by a single processor or split between several processors; reference in this disclosure or the claims to a 'processor' should thus be interpreted to mean 'one or more processors'. The processes, methods and functional modules may be implemented as machine readable instructions executable by one or more processors, hardware logic circuitry of the one or more processors or a combination thereof. Further, the examples disclosed herein may be implemented in the form of a software product. The computer software product may be stored in a non-transitory computer readable storage medium and may include a plurality of instructions for making a computer device (which may be a personal computer, a server or a network device, such as a router, switch, access point, etc.) implement the method recited in the examples of the present disclosure.

Figure 10:
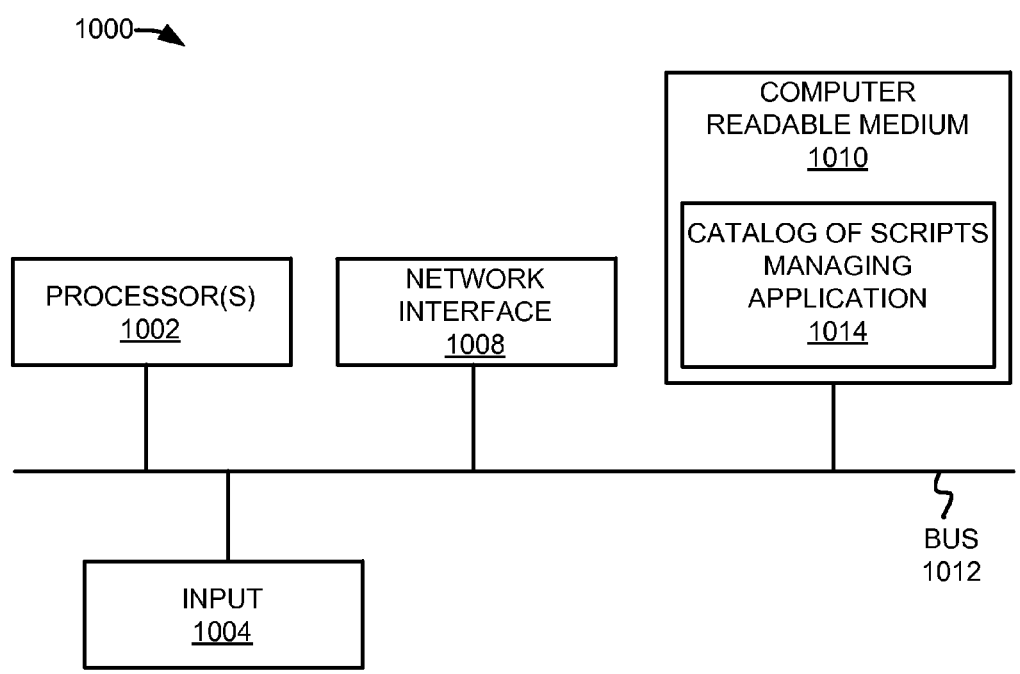
FIG. 10 illustrates a schematic representation of a device, which may be employed to perform various functions of an access point disclosed herein, according to an example of the present disclosure.

Turning now to FIG. 10, there is shown a schematic representation of a device 1000, which may be employed to perform various functions of an access controller disclosed herein, according to an example. The device 1000 may include a processor 1002, an input 1004; a network interface 1008, such as a Local Area Network LAN, a wireless 802.11x LAN, a 3G mobile WAN or a WiMax WAN; and a computer-readable medium 1010. Each of these components may be operatively coupled to a bus 1012.

The computer readable medium 1010 may be any suitable medium that participates in providing instructions to the processor 1002 for execution. For example, the computer readable medium 1010 may be non-volatile media, such as an optical or a magnetic disk; volatile media, such as memory. The computer-readable medium 1010 may also store machine readable instructions to wireless roaming as disclosed herein.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. A method of wireless roaming comprising:
receiving a reauthentication or reassociation message carrying a roaming group information from a wireless client (STA) by an access controller (AC) when the STA is roaming;
determining by the AC, according to the roaming group information and the received reauthentication or reassociation message, whether the STA is roaming between roaming groups or within a roaming group; and
in response to a determination that the STA is roaming between roaming groups, initiating an extension authentication protocol (EAP) reauthentication process and in response to a determination that the STA is roaming within a roaming group, using a Key Cache method to authenticate the STA.

2. The method of claim 1, wherein the AC is configured with a name of a roaming group and wherein determining by the AC, according to the roaming group information and the received reauthentication or reassociation message, whether the STA is roaming between roaming groups or within a roaming group further comprises:
checking whether the name of the roaming group in the roaming group information carried by the reauthentication or reassociation message is identical to the name of the roaming group configured on the AC;
in response to the name of the roaming group in the roaming group information carried by the reauthentication or reassociation message not being identical to the name of the roaming group configured on the AC, determining by the AC that the STA is roaming between roaming groups and initiating the EAP reauthentication process;
in response to the name of the roaming group in the roaming group information carried by the reauthentication or reassociation message being identical to the name of the roaming group configured on the AC, checking by the AC whether Key Cache information of the AC comprises a key entry of the STA;
in response to the Key Cache information of the AC comprising a key entry of the STA, determining by the AC that the STA is roaming within a roaming group and adopting the Key Cache to authenticate the STA; and
in response to the Key Cache information of the AC not comprising a key entry of the STA, determining by the AC that the STA is accessed for the first time and initiating a full EAP authentication process.

3. The method of claim 2, further comprising: prior to checking whether the name of the roaming group in the roaming group information carried by the reauthentication or reassociation message is identical to the name of the roaming group configured on the AC, checking whether the received reauthentication or reassociation message comprises the roaming group information, wherein:
in response to the received reauthentication or reassociation message not comprising the roaming group information, determining, by the AC, that the STA is accessed for the first time and initiating the full EAP authentication process; and
in response to the received reauthentication or reassociation message comprising the roaming group information, checking, by the AC, whether the name of the roaming group in the roaming group information is identical to the name of the roaming group configured on the AC.

4. The method of claim 1, wherein the AC is in one of a plurality of different parallel roaming groups, wherein each of the plurality of different parallel roaming groups contains at least one AC that participates in the roaming of the STA, wherein the ACs within the same roaming group are assigned roaming group information comprising a name of the roaming group, and wherein each of the ACs is to inform the STA that accesses the AC of the roaming group information to which the AC belongs.

5. The method of claim 4, wherein the plurality of ACs that participate in the STA roaming are divided into the different parallel roaming groups by:
sending a broadcasting message periodically by any AC that has not joined a roaming group (AC'),
receiving, in the AC that sent the broadcasting message, a response by a responding AC;
determining whether the response by the responding AC was received within a predetermined time;
in response to a determination that the responding AC has responded to the broadcasting message within the predetermined time,
interacting with messages between the AC' and the responding AC, wherein in response to the AC' obtaining information of the number of STAs that K ACs that are available to be grouped respectively allow to access, the K ACs and the AC' are organized into a linked list according to an order of the number of STAs that the ACs respectively allow to access, wherein K is a positive integer ?_1, and wherein the linked list includes a head element and a tail element;
wherein, in response to the remainder of (K+1) divided by 2 equaling 0, the head element and the tail element of the linked list are combined in turn, until the AC' appears, and sending, by the AC', a unicast confirmation message to the ACs that are combined with the AC' to form a roaming group; and
wherein, in response to the remainder of (K+1) divided by 2 equaling 1:
in response to the AC' not being the $(K+1)^{th}$ element after the ordering, excluding the $(K+1)^{th}$ element and organizing the other elements into the linked list, combining the head element and the tail element of the linked list in turn, until the AC' appears, and sending, by the AC', a unicast confirmation message to the ACs that are combined with the AC' to form a roaming group; and
in response to the AC' being the $(K+1)^{th}$ element after the ordering, combining the head element and the tail element of the linked list and sending, by the AC', a unicast confirmation message to the ACs that are combined with the AC' to form a roaming group;
in response to the AC' not receiving any response message from any other ACs in the predetermined time, causing the AC' to become a separate roaming group and broadcasting a request message at a predetermined interval of time, until the AC' receives a response from any other ACs.

6. The method of claim 1, wherein initiating the full EAP authentication process further comprises initiating a full EAP authentication process in response to the EAP reauthentication process failing.

7. An access controller (AC) that participates in a wireless client (STA) roaming, the AC being divided into a roaming group, the AC comprising:
a configuration module to configure the AC with roaming group information comprising a name of the roaming group to which the AC belongs;

an information interaction module to inform the STA that accesses the AC of the roaming group information and further to receive a reauthentication or reassociation message carrying the roaming group information from the STA when roaming is initiated; and an information processing module to determine, according to the configured roaming group information and the received reauthentication or reassociation message, whether the STA is roaming between roaming groups or within a roaming group, wherein the information processing module is to initiate an EAP reauthentication process in response to a determination that the roaming is between roaming groups, and wherein the information processing module is to adopt a Key Cache method to authenticate the STA in response to a determination that the roaming is within a roaming group.

8. The access controller of claim 7, wherein the information processing module is to check whether the name of the roaming group in the roaming group information carried by the reauthentication or reassociation message is identical to the name of the roaming group configured on the AC, wherein in response to the name of the roaming group in the roaming group information carried by the reauthentication or reassociation message not being identical to the name of the roaming group configured on the AC, the AC is to determine that the STA is roaming between roaming groups and to initiate the EAP reauthentication process; and in response to the name of the roaming group in the roaming group information carried by the reauthentication or reassociation message being identical to the name of the roaming group configured on the AC, the AC is to check whether Key Cache information of the AC comprises a key entry of the STA;

in response to the Key Cache information of the AC comprising a key entry of the STA, the AC is to determine that the STA is roaming within a roaming group and is to adopt the Key Cache to authenticate the STA; and in response to the Key Cache information of the AC not comprising a key entry of the STA, the AC is to determine that the STA is accessed for the first time and to initiate a full EAP authentication process.

9. The access controller of claim 8, wherein the information processing module is further to check, prior to checking whether the name of the roaming group in the roaming group information carried by the reauthentication or reassociation message is identical to the name of the roaming group configured on the AC, whether the received reauthentication or reassociation message comprises the roaming group information, wherein:

in response to the received reauthentication or reassociation message not comprising the roaming group information, the AC is to determine that the STA is accessed for the first time and to initiate the full EAP authentication process; and in response to the received reauthentication or reassociation message comprising the roaming group information, the AC is to check whether the name of the roaming group in the roaming group information is identical to the name of the roaming group configured on the AC.

10. The access controller claim 7, wherein the information process module is further to initiate a full EAP authentication process in response to a failure in the EAP reauthentication process.

11. The access controller of claim 7, further comprising:
a key aging module to set a key aging timer on the AC prior to initiation of the roaming.

12. The access controller of claim 7, wherein the key aging module is further to trigger the key aging timer on the AC to begin timing when the STA leaves the AC.

13. The access controller of claim 7, wherein the key aging module is further to delete the Key Cache entries corresponding to the STA following expiration of the aging time.

14. The access controller of claim 7, wherein the information interaction module is further to no longer accept any reauthentication or reassociation message from the STA if the AC receives the STA reauthentication or reassociation message with the same MAC address for a number of times larger than a predefined number before the aging time expires.

15. A non-transitory computer readable storage medium on which is embedded machine readable instructions that when executed by a processor are to cause the processor to:

receive a reauthentication or reassociation message carrying a roaming group information from a wireless client (STA) when the STA is roaming;

determine, according to the roaming group information and the received reauthentication or reassociation message, whether the STA is roaming between roaming groups or within a roaming group; and in response to a determination that the STA is roaming between roaming groups, initiate an extension authentication protocol (EAP) reauthentication process and in response to a determination that the STA is roaming within a roaming group, adopt a Key Cache method to authenticate the STA.

* * * * *

UNITED STATES PATENT AND TRADEMARK OFFICE
CERTIFICATE OF CORRECTION

PATENT NO. : 9,173,083 B2
APPLICATION NO. : 14/401434
DATED : October 27, 2015
INVENTOR(S) : Shuwei Nie It is certified that error appears in the above-identified patent and that said Letters Patent is hereby corrected as shown below:

IN THE CLAIMS

In column 12, line 29, in Claim 5, delete "integer ?_1" and insert -- integer $\geq 1$ --, therefor.

In column 14, line 14, in Claim 10, delete "controller claim" and insert -- controller of claim --, therefor.

Signed and Sealed this
Twenty-second Day of March, 2016

Michelle K. Lee
*Director of the United States Patent and Trademark Office*